United States Patent
Hageman

[15] 3,668,258
[45] June 6, 1972

[54] SULFUR-CONTAINING POLYARYL POLYPHENOLIC COMPOUNDS AND PROCESS

[72] Inventor: Howard A. Hageman, Southbury, Conn.
[73] Assignee: Uniroyal Inc., New York, N.Y.
[22] Filed: Mar. 17, 1969
[21] Appl. No.: 807,956

[52] U.S. Cl..........................260/609 F, 260/45.95, 260/48, 260/608, 260/609 E
[51] Int. Cl.......................................................C07c 149/36
[58] Field of Search...........................260/609 F, 619 B, 608

[56] References Cited

UNITED STATES PATENTS

| | | | |
|---|---|---|---|
| 2,634,297 | 4/1953 | Moyle | 260/619 |
| 2,966,477 | 12/1960 | Morris | 260/619 |
| 3,232,993 | 2/1966 | Vitrone | 260/619 |
| 3,317,459 | 5/1967 | Spacht | 260/619 |

OTHER PUBLICATIONS

Zinke et al. " Chem. Abstracts" Vol. 35 (1941) p. 1,778

*Primary Examiner*—Joseph Rebold
*Assistant Examiner*—D. R. Phillips
*Attorney*—Willard R. Sprowls

[57] ABSTRACT

The compounds are of the class of thiobis(beta-aryl-alkylene)diphenols and chain-extended polythiopoly-phenols derived therefrom. They are useful as anti-oxidants in compositions containing unsaturated rubbers — that is, so-called diene rubbers. A typical compound of the class is 4,4'-thiobis(beta-phenyl-ehtylene)diphenol, made by condensing bis(beta-chloro-phenethyl)sulfide (1 mole) with phenol (2 moles). Chain extension is apt to occur by reaction of the first-formed mono-thio diphenol with additional amounts of the dichloro coupling agent and the starting phenol, forming polythio polyphenolic compounds having repeated alternating units of the coupler and the the phenol moieties.

17 Claims, No Drawings

SULFUR-CONTAINING POLYARYL POLYPHENOLIC COMPOUNDS AND PROCESS

BACKGROUND OF THE INVENTION

The invention pertains to new phenolic compounds useful as stabilizers or antioxidants, to a method of making them, and to diene rubber compositions containing effective amounts of these stabilizers.

In the past, various highly hindered monophenols and diphenols having alkyl substituents ortho to the phenolic hydroxyl groups have been used as antioxidants. Some of these have had sulfur atoms linking two phenol rings either directly, as in U.S. Pat. Nos. 3,099,639 and 3,114,713, or through methylene bridges, as in U.S. Pat. Nos. 3,310,587 and 2,322,376, or through trimethylene groups, as in U.S. Pat. No. 3,234,177.

SUMMARY OF THE INVENTION

I have discovered a new class of polyphenols wherein phenol rings are linked together by thiobis(beta-arylalkylene) radicals containing the essential structural grouping:

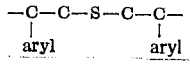

The new compounds accordingly are characterized by containing the essential skeletal structure:

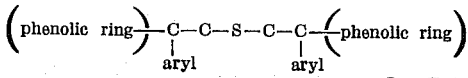

thus having each of two carbon atoms, beta to a sulfur atom, joined to two aromatic groups of which only one is phenolic. In many of the new products the beta,beta'-diarylthiodialkylene and phenolic ring configuration is repeated a number of times, yielding polythiopolyphenols of higher chain length and higher molecular weight.

DETAILED EXPOSITION OF THE INVENTION

My new compounds may be designated as bis[beta-(hydroxyaryl)-beta-arylalkyl] sulfides, or preferably as thiobis(beta-arylalkylene)diphenols, having the general formula

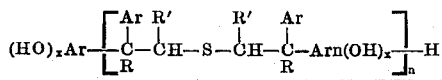

wherein
Ar is aryl,
Arn is arylene,
R is H or an alkyl group having one to four carbon atoms,
R' is H or methyl, or is —CH$_2$— or —CH$_2$CH$_2$— joined ortho to the non-phenolic Ar,
$x$ is 1 or 2, and
$n$ is a number from 1 to 5. When $n$ is 1, the formula reduces to that of a monothio diphenol compound:

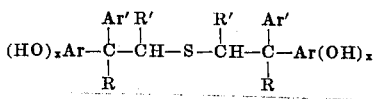

The simplest member of the class is 4,4'-thiobis(beta-phenylethylene)diphenol: [(p-)HO—C$_6$H$_4$—CH(C$_6$H$_5$)—CH$_2$—]$_2$S.

The new compounds range in consistency from highly viscous liquids to amorphous, brittle, resinous materials of low softening point, being in some cases soluble in aqueous alkali, and those of molecular weight below 1,000 being soluble in methanol, in acetone, and in benzene.

That my products have the phenol nuclei linked to the coupling structure at ring carbon atoms, and are not phenol ethers, is clearly demonstrated by their infrared spectra, which show strong absorption at a frequency of 3,600 cm$^{-1}$ which is characteristic of a phenolic hydroxyl group. In the case of my products made from the simpler phenols, the solubility of the products in aqueous alkali also demonstrates the presence of phenolic hydroxyl.

That my relatively unhindered phenolic compounds have high antioxidant activity is quite unexpected in view of the general consensus that phenolic antioxidants must, in order to be effective, be of the highly hindered type exemplified by the commercial antioxidant 2,2'-methyl-enebis(4-methyl-6-tert-butylphenol) and the like.

The relatively unhindered character of several of my new phenols renders them especially advantageous for incorporation in aqueous synthetic rubber latices: being soluble in aqueous alkali, they can be added to such latices as alkaline solutions, and are later coprecipitated with the rubber by the conventional coagulants, to recover the solid rubber containing the antioxidant finely and uniformly dispersed throughout the rubber. The antioxidants may, of course, be incorporated in rubber cements and solid rubbers by conventional milling and other techniques.

Preparation of my new antioxidants is accomplished by interacting a bis(beta-chloro-beta-arylalkyl) sulfide with a phenol having at least one reactive hydrogen on the ring, ortho or para to the hydroxyl. Hydrogen chloride is split off, the hydrogen atoms coming from the phenol nuclei, and, in the simplest form of the reaction, two molecules of the phenol are coupled together by one thiobis(beta-arylalkylene) radical, to form a monothio diphenol product. This course of reaction is favored by the presence of a considerable excess of the phenol—as by mixing 5 moles of the phenol with one mole of the dichloro coupling agent, and heating the mixture. As the ratio of phenol to dichloro reagent is reduced, chain extension is induced whereby one or both phenol nuclei of the first-formed monothio diphenol compound react with further coupling agent and then with more of the original phenol. The resulting products contain in a chain $n$ units of the thiobis(beta-arylalkylene) coupling structure and $n+1$ units of the starting phenol, the chain being terminated at both ends by phenol units. These chain-extended products are referred to as poly[thiobis(beta-arylalkylene)] polyphenols.

Suitable phenols for use in my reaction are readily chosen, being those known to be readily capable of alkylation. They include the following:

| | |
|---|---|
| phenol | p-isopropylphenol |
| o-cresol | o-sec-butylphenol |
| m-cresol | o-phenylphenol |
| p-cresol | m-benzyloxyphenol |
| 2,6-xylenol | p-methoxyphenol |
| 2,5-xylenol | p-(methylthio)phenol |
| 2,4-xylenol | catechol |
| 3,5-xylenol | resorcinol |
| alpha-naphthol | hydroquinone |
| beta-naphthol | guaiacol |
| o-t-butylphenol | 4-t-octylresorcinol |
| p-t-butylphenol | t-butylhydroquinone |
| o-allylphenol | 4,4'-isopropylidenediphenol |
| p-nonylphenol | 4,4'-oxydiphenol |
| o-isopropylphenol | 4,4'-thiodiphenol |
| | 4,4'-dithiodiphenol |

My new reaction is typified by the following diagrams:
1. formation of a 1:2 monothio diphenol compound

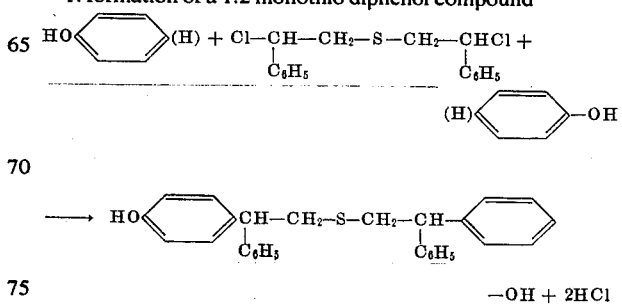

2. formation of a polymeric, or chain-extended, product

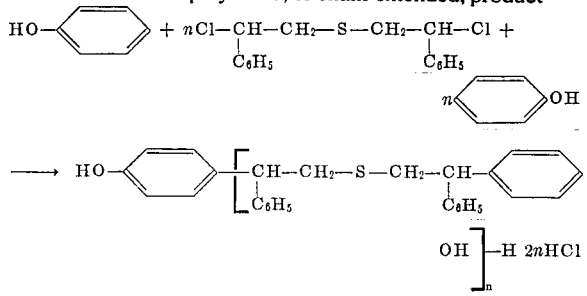

The reaction forming the new phenols of my invention may be accelerated by the addition of a catalytic amount of a Lewis acid, such as aluminum chloride, to the reaction mixture. This is particularly desirable in the case of mildly hindered phenols such as 2,6-xylenol and 2-tert-butylphenol, with which $AlCl_3$ is quite effective in promoting the reaction. Such highly hindered phenols as 2,6-di-tert-butylphenol, however, do not react in the sense of my invention.

Mixtures of phenols may be used in my reaction in place of a single phenol. Thus, technical grades of cresylic acid, which are mixtures of isomeric cresols, may be used.

It is often convenient to use an inert liquid reaction medium in carrying out the reaction of my invention. Often the solvent will be the same one used in preparing the dichloro coupling agent. This is usually a saturated hydrocarbon—for example, hexane, cyclohexane, or petroleum ether; or an aromatic hydrocarbon—for example, benzene, toluene or xylene. In the case of highly polar phenols such as resorcinol or hydroquinone, it is preferable to use an inert polar solvent, acetonitrile being quite suitable.

The temperature at which my reaction is carried out is not critical. Temperatures in the range from 50° to 100° C. are effective and convenient, and the time required for completing the reaction is generally from 4 to 24 hours. The reaction is judged to be complete when the generation of hydrogen chloride has ceased. I then usually subject the reaction mixture to steam distillation in order to remove, first, the solvent, and then as much of the unreacted phenol as possible. Vacuum distillation may be used when needed, to remove phenols not volatile with steam. Unreacted phenols may also be removed by washing with hot water or by fractional precipitation from suitable mixed solvents.

The bis(beta-chloro-beta-arylalkyl) sulfides, employed as the bifunctional alkylating agent or coupling agent in preparing my new phenolic products, are made by a known reaction described by Pope and Smith in the Journal of the Chemical Society, 121, 1166 (1922), and German Pat. No. 840,691. Sulfur dichloride reacts with an alpha-arylolefin, in the following sense, using styrene as an example:

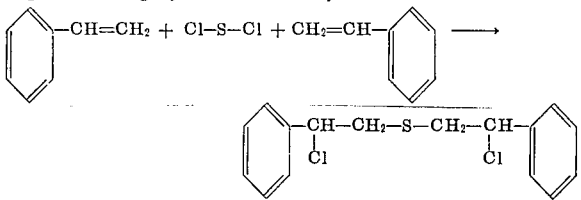

Other arylolefins suitable for use in this reaction include the following:

- alpha-methylstyrene
- p-tert-butylstyrene
- 1,2-dihydronaphthalene
- 1-phenylcyclohexene
- p-chlorostyrene
- acenaphthalene
- vinyltoluene
- anethole
- indene The beta-aryl groups characteristic of my coupling agents accordingly may contain chloro or various hydrocarbon and hydrocarbonoxy substituents.

Commercial grades of sulfur dichloride contain 10–18 percent of sulfur monochloride, $S_2Cl_2$, as well as traces of free chlorine. A study of the stability and composition of sulfur dichloride has been made by Rosser and Witt, J. Applied Chem., 10, 229 (1960). In carrying out the process of my invention, it is found that the products have a sulfur content which is frequently higher than the theoretical value.

According to Pope and Smith (loc. cit.), sulfur monochloride reacts with styrene to form bis(2-chloro-2-phenylethyl) sulfide and free elemental sulfur. Thus, while the sulfur monochloride (ClSSCl) present yields the same bis(2-chloro-2phenylethyl) sulfide, as does sulfur dichloride, a small amount of free sulfur is generated.

DESCRIPTION OF THE PREFERRED EMBODIMENTS

EXAMPLE 1

Reaction of bis(beta-chlorophenethyl) sulfide with phenol in three different molar ratios To a stirred solution of 104 g. of styrene in 150 ml. of hexane there was gradually added, over one-half hour, 52 g. of sulfur dichloride*(*Commercial sulfur dichloride having a ClSCl content of 82–84 percent.). Cooling was employed to keep the temperature of the exothermic reaction below 35° C. After the addition, the mixture was stirred for one-half hour and then the hexane was removed by distillation. There was obtained 146 g. of bis(beta-chlorophenethyl) sulfide as a clear, pale yellow oil. This material was found to contain 21.6 percent chlorine and 11.9 percent sulfur.

a. (Phenol)/(Coupler) = 5:1

Upon addition of 94 g. (1.0 mole) of molten phenol (at 45°–55 C.) to 62.2 g. (.20 mole) of bis(beta-chlorophenethyl) sulfide, there was rapid evolution of hydrogen chloride. After this had subsided, the homogeneous, viscous mixture was heated at 75°–80° C. for 4 hours. The mixture was then subjected to steam distillation for 3 hours, until the distillate no longer gave a positive ferric chloride test for phenol. After the residue from the steam distillation had cooled, the amorphous solid was dissolved in ether, and the solution was separated from the water. After removal of the ether, the residue was heated at 110°–115° C. for 45 minutes. Upon cooling, there was obtained 80 g. of 4,4'-thiobis(beta-phenyl-ethylene)diphenol as a flesh-colored, brittle resin which softens in the range 40°–50° C. This product is soluble in benzene, methanol, acetone and chloroform, but insoluble in hexane and carbon tetrachloride. It can be dissolved completely in strong aqueous sodium hydroxide, and is precipitated from this solution upon treatment with carbon dioxide. This product gave the following analytical data:

Mol. wt. = 425
Hydroxyl No. = 252
% Sulfur = 8.26 b. (Phenol/(Coupler) = 2.5:1

A sample of bis(beta-chlorophenethyl) sulfide was prepared in the manner described previously, except that freshly distilled sulfur dichloride (b.p. 50°–62° C.) was used for the reaction with styrene.

Upon the addition of a solution of 118 g. (1.25 moles) of phenol in 100 g. of toluene to 155 g. (0.50 mole) of this sample of bis(beta-chlorophenethyl) sulfide, the resulting solution assumed a red-amber color as hydrogen chloride began to evolve slowly. After being heated at 70°–80° C. for 4 hours this mixture had changed to a light amber color and the rate of hydrogen chloride evolution had greatly decreased. After standing overnight at room temperature, this mixture was steam-distilled for 3 hours to remove the toluene and unreacted phenol. The off-white molten residue was then dissolved in benzene and separated from the water. After removal of the benzene, the residue was heated at 115°–120° C. for 40 minutes. Upon cooling to room temperature, there was obtained 194 g. of a clear, pale yellow, brittle resin which sinters in the range of 40°–46° C. The following analytical data were obtained on this product:

Mol. wt. = 558
Hydroxyl No. = 220
% S = 8.18 c. (Phenol)/(Coupler) = 2.5:1

To a stirred solution of 416 g. (4.0 moles) of styrene in 500 g. of toluene there was added, gradually over 1 hour, 206 g. (2.0 moles) of sulfur dichloride. Cooling of the reaction mixture was employed to keep the temperature in the range 15°–30 C. during the addition. There was then added a mixture of 470 g. (5.0 moles) of phenol and 100 g. of toluene. This mixture was then heated to 65° C. and kept in the temperature range 65°–80° C. for 6 hours while being stirred. At this stage there was observed only a slight evolution of hydrogen chloride. After standing overnight, this mixture was steam-distilled for 6 hours to remove the last traces of unreacted phenol. The residual molten mass was then heated under vacuum with stirring, to remove the water. The product obtained, after cooling to room temperature, consisted of 769 g. of a clear, pale amber, brittle resin having a hydroxyl number of 222, a sulfur content of 8.93 percent and a molecular weight of 548.

d. (Phenol)/(Coupler) = 1:1

To a solution of 23.5 g. (0.25 mole) of phenol in 100 g. of benzene was added 78 g. (0.25 mole) of bis(beta-chlorophenethyl) sulfide. After being heated at 75°–80° C. for 5 hours, this solution stood overnight. Then the benzene was removed by distillation and the residue ultimately heated to 110°–120° C. for 30 minutes. After cooling of the molten residue, there was obtained 84 g. of a clear, amber, brittle resin which softens in the range 58°–65° C. Unlike the products in a, b, and c, this product, containing polyphenols of higher molecular weight, is insoluble in methanol. It gave the following analytical data:

Mol. wt. = 1190
% S = 9.65

Data on the above experimental runs are tabulated below in order to show at a glance the way in which the average molecular weight of the phenolic product rises as the ratio (moles of phenol)/(moles of coupler)—designated $M_P/M_A$—in the feed is reduced. This ratio is designated as $R_T$ for the theoretical structures and $R_E$ for the actual experimental runs.

TABLE I

| Assumed Structure | $R_T$ | $M_P/M_A$ | | Hydroxyl No. | Mol. Wt. |
|---|---|---|---|---|---|
| PAP | 2.00 | 2/1 | 7.51 | 263 | 426 |
| P(AP)$_2$ | 1.50 | 3/2 | 8.44 | 221 | 758 |
| P(AP)$_3$ | 1.33 | 4/3 | 8.8 | 206 | 1090 |
| P(AP)$_4$ | 1.25 | 5/4 | 9.02 | 197 | 1422 |

TABLE II

| Experiment | $R_E$ | % S | Hydroxyl No. | Mol. Wt. |
|---|---|---|---|---|
| E–1–a | 5.00 | 8.26 | 252 | 425 |
| E–1–b | 2.50 | 8.18 | 220 | 558 |
| E–1–c | 2.50 | 8.93 | 222 | 548 |
| E–1–d | 1.00 | 9.65 | | 1190 |

The product from Experiment E–1–a is judged to have the highest content of 4,4'-thiobis(beta-phenylethylene)diphenol. Close similarity was observed between the I.R. spectrum of E–1–a and that of a sample of 4-(alpha-phenethyl)phenol, thus supporting the structure assigned to my product.

EXAMPLE 2

Reaction of bis(beta-chloro-beta-phenylpropyl) sulfide with phenol

To a stirred solution of 236 g. (2.0 moles) of alpha-methyl-styrene in 250 g. of toluene was slowly added 103 g. of sulfur dichloride, while the temperature of the mixture was kept in the range 15°–30° C. Then a mixture of 235 g. (2.50 moles) of phenol and 100 g. of toluene was added, and the mixture was heated at 60°–80° C., with stirring, for 9 hours. After steam distillation of this mixture for 4½ hours, the distillate was free of phenol. By heating the residue to 90°–100° C. under vacuum (20 mm.) with stirring, the removal of water was complete. The product consisted of 406 g. of a clear, red-amber resin which is brittle but sinterable at room temperature. This product is soluble in benzene, acetone and methanol, but insoluble in hexane. It is soluble in aqueous sodium hydroxide, from which it can be reprecipitated with carbon dioxide. The following analytical data were obtained:

Hydroxyl No. = 202
%S = 8.79

The main component of this product is 4,4'-thiobis(beta-phenylpropylene)diphenol.

EXAMPLE 3

Reaction of bis(beta-chlorophenethyl) sulfide with o-cresol

During an hour, 103 g. of sulfur dichloride was added to a solution of 208 g. of styrene in 250 g. of toluene while the temperature of the mixture was kept at 15°–25° C. Then 324 g. of o-cresol was added, and the mixture was heated to 70°–75° C., where it was maintained for 5½ hours as hydrogen chloride evolved. After standing overnight, the mixture was steam-distilled for 6 hours to remove unreacted o-cresol. After the molten residue was heated at 110°–120° C. for 2 hours to remove the water, there was obtained 428 g. of a light amber resin consisting mainly of 4,4'-thiobis(beta-phenylethylene)di-o-cresol having the following analytical values:

Mol. wt. = 476
Hydroxyl no. = 227
% S = 8.04

This product readily forms a water-soluble sodium salt when treated with aqueous sodium hydroxide.

EXAMPLE 4

Reaction of bis(beta-chlorophenethyl) sulfide with p-cresol

During 1 hour, 103 g. of sulfur dichloride was added to a solution of 208 g. of styrene in 300 g. of toluene, while the temperature was kept at 15°–30° C. Then 216 g. of p-cresol was added, and the mixture was heated at 70°–80° C. for 10 hours. This mixture was then steam-distilled for 6 hours, and the molten residue heated to 90°–100° C. under vacuum for removal of water. When cooled to room temperature this product consisted of 404 g. of a clear, pale yellow, brittle resin which softens in the range of 50°–55° C. This product is soluble in methanol, benzene and acetone, but insoluble in hexane, and does not dissolve in aqueous sodium hydroxide. The infrared spectrum shows a sharp peak at 3,600 cm$^{-1}$, denoting the presence of phenolic hydroxyl. The spectrum and lack of solubility in aqueous sodium hydroxide are consistent with the assigned structure—2,2'-thiobis(beta-phenylethylene)di-p-cresol. The product analyzed as follows:

Mol. wt. = 528
% S = 8.20

EXAMPLE 5

Reaction of bis(beta-chlorophenethyl) sulfide with 2,6-xylenol

This experiment demonstrates that, when the diphenol formed is incapable of being further alkylated, a product free of polymers can be obtained. It also shows that this type of alkylation can be catalyzed by aluminum chloride.

When a solution of 62.2 g. (0.20 mole) of bis(beta-chlorophenethyl) sulfide and 48.8 g. (0.40 mole) of 2,6-xylenol in 150 ml. of benzene was heated at 70°–75° C. for 20 minutes, no evolution of hydrogen chloride was detected. Upon addition of 1.0 g. of anhydrous aluminum chloride, vigorous evolution of hydrogen chloride took place. After being heated at 70°–80° C. for 3 hours, the benzene solution was cooled and extracted with dilute hydrochloric acid and then extracted with water so as to remove the catalyst. After removal of the benzene by distillation, the residue was heated at 120° C. under a vacuum of 0.2 mm. for 2 hours. The product consisted of 93 g. of a clear, amber, amorphous solid which is soluble in aqueous potassium hydroxide. This product is 4,4'-thiobis(beta-phenylethylene)di-2,6-xylenol.

| Calcd. for $C_{32}H_{34}O_2S$ | Mol. wt. = 482 |
| --- | --- |
| | Hydroxyl No. = 233 |
| | % S = 6.64 |
| Found | Mol. wt. = 430 |
| | Hydroxyl No. = 231 |
| | % S = 6.77 |

EXAMPLE 6

Reaction of bis(beta-chlorophenethyl) sulfide with 3° meta,para-cresol

That mixtures of phenolic materials can be used to obtain valuable products is demonstrated in this example. The 3° meta,para cresol mixture consists of 58 percent meta-cresol and 33 percent para-cresol, along with 8–9 percent of other tar acids.

After 208 g. of styrene in 250 g. of toluene was reacted with 103 g. of sulfur dichloride as described in previous examples, there was added to this solution 270 g. of 3° meta,para-cresol mixture. After 6 hours' heating at 60°–70° C., the evolution of hydrogen chloride ceased. The mixture was then steam-distilled for 6 hours, and the molten residue was separated from the water and dried by heating at 110°–120° C. for 2 hours. The product consisted of 389 g. of a clear, yellow, brittle resin. Hydroxyl No. = 225; % S = 8.70.

EXAMPLE 7

Reaction of bis(beta-chlorophenethyl) sulfide with p-nonylphenol

To a mixture resulting from the reaction of 52 g. of sulfur dichloride with 104 g. of styrene in 100 g. of toluene, there was added 330 g. of p-nonylphenol (the "nonyl" in this instance being derived from the highly branched trimer of propylene). This mixture was stirred at a temperature of 65°–75 C. for 24 hours. Toluene and unreacted p-nonylphenol were removed by vacuum distillation. The residue was ultimately heated to 160° C. under a vacuum of 0.1–0.2 mm to remove as much of the remainder p-nonylphenol as possible. The product consisted of 314 g. of clear, amber, viscous liquid which is not pourable at room temperature. Unlike the products of previous examples, this material is very soluble in hexane. This product is 2,2'-thiobis(beta-phenylethylene)bis(4-nonylphenol).

Mol. wt. = 579
% S = 5.64

EXAMPLE 8

Reaction of bis(beta-chlorophenethyl) sulfide with o-t-butylphenol

After reaction of 103 g. of sulfur dichloride with 208 g. of styrene in 300 g. of toluene, as in previous examples, there was added 375 g. of o-t-butylphenol. This mixture was heated, with stirring at 65°–75° C. for 28 hours as hydrogen chloride was slowly evolved. After steam-distillation of this mixture for 6 hours, the residue was dried by heating under vacuum. The product consisted of 488 g. of a brittle, amber resin which is soluble in hot hexane. A sharp peak in the infrared spectrum at 3,600 cm$^{-1}$ shows the presence of phenolic hydroxyl. Analysis gave the following data:

Mol. wt. = 492
% S = 7.02

The main component of this product is 4,4'-thiobis(beta-phenethylene)bis(2-t-butylphenol).

EXAMPLE 9

Reaction of vinyltoluene with sulfur dichloride and then with phenol

Commercial vinyltoluene consists of a mixture of 60 percent m-methylstyrene and 40 percent p-methylstyrene. Therefore, upon reaction with sulfur dichloride, a mixture of isomeric bis(beta-chloro-beta-tolylethyl) sulfides is obtained. This will obviously lead to a mixture of isomeric phenolic products.

By reacting sulfur dichloride with vinyltoluene in hexane, there was prepared the mixed bis(beta-chloro-beta-tolylethyl) sulfides, of which 136 g. was taken and dissolved in 200 g. of benzene. After 94 g. of phenol was added, the mixture was heated at 70°–80° C. for 5 hours. The benzene and excess phenol were removed by steam distillation for 3 hours. After the residue was dried by heating under vacuum, 174 g. of a clear, yellow, brittle resin was obtained, having the following analysis:

Mol. wt. = 476
Hydroxyl No. = 244
%S = 8.64

This product readily dissolves in aqueous sodium hydroxide.

EXAMPLE 10

Reaction of anethole with sulfur dichloride and then with phenol

To a solution of 148 g. (1.0 mole) of anethole [1-(p-methoxyphenyl)-propene] in 150 ml. of benzene was added, over 40 minutes, 52 g. of sulfur dichloride, while the temperature of the reaction mixture was not allowed to exceed 30° C. After standing at room temperature for 1 hour, this solution was added with stirring to 118 g. (2.0 moles) of phenol heated to 50°–55° C. The resulting dark red mixture was stirred at 70°–80 C. for 5 hours as hydrogen chloride was evolved. After steam-distilling this mixture for 4 hours, the light tan, molten residue was dried by heating at 110°–115° C. under vacuum for 2 hours while being stirred. After cooling, the product consisted of 249 g. of a clear amber, brittle resin which is insoluble in hexane. This product readily dissolves in aqueous sodium hydroxide. It consists mainly of 4,4'-thiobis[beta-(4-methoxyphenyl)propylene] diphenol, having the following analysis:

Mol. wt. = 551
Hydroxyl No. = 192
%S = 6.95

EXAMPLE 11

Reaction of t-butylstyrene with sulfur dichloride, then with phenol

The t-butylstyrene used consists of 95 percent of p-t-butylstyrene and 5 percent m-t-butylstyrene.

To a solution of 160 g. of t-butylstyrene in 150 ml. of toluene there was added, over 45 minutes, 51.5 g. of sulfur dichloride, while the temperature of the reaction mixture was kept in the range of 20°–25° C. Then 118 g. of phenol was added, and the mixture was gradually heated to 60° C. during 1 hour and then maintained at 60°–65° for an additional 2 hours, as hydrogen chloride was evolved. This mixture was then steam-distilled for 3 hours to remove phenol. After cooling, the residue was dissolved in ether and separated from the water. Removal of the ether and heating the residue to 90°–100° C. under vacuum gave 260 g. of a clear, pale amber brittle resin which melts over the range 72°–80° C. The sodium salt of this product, prepared in methanol, is a white, amorphous solid which is insoluble in water. The main component of the product is 4,4'-thiobis[beta-(4-t-butyl-phenyl)ethylene]diphenol. The following analytical figures were obtained:

Mol. wt. = 656
Hydroxyl No. = 170
%S = 6.84
%C = 79.85
%H = 8.10

EXAMPLE 12

Reaction of 2,2'-thiobis(1-chloroindane) with phenol

During 40 minutes, 51.5 g. sulfur dichloride was added to a solution of 116 g. of indene in 200 ml. of hexane, while the temperature of the mixture was kept in the range of 18°–25°C. Removal of the hexane gave 164 g. of 2,2'-thiobis(1-chloroindane) as a clear, amber oil. When this product was treated with a mixture of 141 g. of phenol and 100 g. of benzene at 35° C., the vigorous evolution of hydrogen chloride began immediately. After the reaction had subsided, this mixture was heated at 75°–85° C. for 2 hours and then steam-distilled for 4½ hours. The molten, viscous residue was heated to 110°–120° C. for 1½ hours. This product consisted of 214 g. of a tan, brittle resin which is soluble in benzene, acetone, and methanol but insoluble in hexane. It readily dissolves in aqueous potassium hydroxide to give a dark brown solution. This product melts in the range 75°–85° C. It consists mainly of 4,4'-(2,2'-thiodiindan-1-yl)diphenol. The following analytical data were obtained:

Mol. wt. = 544
Hydroxyl No. = 268
%S = 7.18

EXAMPLE 13

Reaction of bis(beta-chlorophenethyl) sulfide with resorcinol

Bis(beta-chlorophenethyl) sulfide (155 g.), prepared as in Example 1, was added to a solution of 165 g. of resorcinol in 250 g. of acetonitrile at 30° C. This mixture assumed a deep red color as hydrogen chloride evolved rapidly and the temperature of the mixture rose to 52° C. This mixture was stirred for 1 hour at 50°–60° C. and then for 2 hours at 70°–75° C. After distilling off 150 ml. of water at 70° C. After the layers were allowed to separate, the water layer was decanted from the viscous lower layer which was twice again washed with two 500 ml. portions of hot water. After cooling, the water-insoluble material was dissolved in ether and this ether solution twice extracted with water. After removing the ether, the residue was heated with stirring at 110°–120° C. for 1 hour. The product consisted of 215 g. of a clear, amber, brittle resin which is soluble in acetone and methanol but insoluble in benzene. It readily dissolves in aqueous sodium hydroxide. The major component of this product is 4,4'-thiobis(beta-phenyl-ethylene)diresorcinol. The following data were obtained:

Mol. wt. = 442
Hydroxyl No. = 427
%S = 7.62

EXAMPLE 14

Reaction of bis(beta-chlorophenethyl) sulfide with 4,4'-isopropylidenediphenol

To a solution of 25.1 g. of 4,4'-isopropylidene-diphenol in 100 g. of acetonitrile was added 31.1 g. of bis(beta-chlorophenethyl) sulfide. Upon heating of this mixture to 75°–80 C., gradual evolution of hydrogen chloride began. After 19 hours' heating at 75°–80° C., the acetonitrile was distilled from the dark brown solution. The molten residue was stirred at 110°–115° C. for one-half hour. After cooling, the product consisted of 54 g. of a dark red-brown, brittle resin which melts in the range 58°–64° C. This product is insoluble in benzene but soluble in acetone and methanol. This polymeric product analyed as follows:

Mol. wt. = 882
%S = 6.78

EXAMPLE 15

Reaction of bis(beta-chlorophenethyl) sulfide with o-phenylphenol

To a solution of 34 g. of o-phenylphenol in 100 ml. of benzene was added 31.1 g. of bis(beta-chlorophenethyl) sulfide. The mixture was warmed to 50°–55° C., then 1.0 g. of anhydrous aluminum chloride was added and the mixture heated at 80°–85° C. for 5 hours. This benzene solution was washed with dilute hydrochloric acid and then with water to remove the catalyst. After the benzene was removed, the residue was heated at 110° C. under a vacuum of 0.2 mm. The product consisted of 57 g. of a clear, light amber, brittle resin which melts in the range 48°–54° C. This product does not dissolve in aqueous sodium hydroxide. It is soluble in benzene and acetonitrile and in hot ethanol. The infrared spectrum shows a sharp peak at 3,600 cm.$^{-1}$ typical of a hindered phenolic hydroxyl group. The product is essentially 4,4'-thiobis-(beta-phenylethylene)di-o-biphenylol. Analysis:

Mol. wt. = 456
% S = 6.34

EXAMPLE 16

Reaction of bis(beta-chlorophenethyl) sulfide with beta-naphthol

To a solution of 44.3 g. of β-naphthol in 160 ml. of benzene at 55° C. was added a solution of 48 g. of bis(beta-chlorophenethyl) sulfide in 40 ml. of benzene. Upon mixing, rapid evolution of hydrogen chloride began. After the mixture was heated at 75°–80° C. for 2 hours, the benzene was removed by distillation. The residue was then heated at 95°–100b*L* C. under a vacuum of 0.5 mm. for one-half hour. There was obtained 85 g. of a red-amber, brittle resin containing β-naphthol as a contaminant. To reduce the content of beta-naphthol, the product was dissolved in methanol and the solution then diluted with warm water. The precipitated material was recovered, and dissolved in ether After removal of the ether, the residue was heated at 100°–110° C. under vacuum. There was obtained 72 g. of a clear, red-amber, brittle resin soluble in benzene and methanol but insoluble in hexane. This product forms a sodium salt which is soluble in warm water but only slightly soluble in cold water. The principal component of this product is 1,1'-thiobis(beta-phenylethylene)-di-2-naphthol. The following analysis was obtained:

Hydroxyl No. = 169
% S = 7.22

By using alpha-naphthol in place of beta-naphthol in the above procedure there is produced the corresponding 4,4'-thiobis(beta-phenylethylene)di-1-naphthol.

DESCRIPTION OF USES OF THE POLYPHENOLS OF THE INVENTION

Polyphenol compositions of this invention have been shown to be valuable antioxidants for a variety of elastomers and thermoplastic polymers. Among the test methods that are commonly employed for the evaluation of the antioxidant activity of a chemical are:

1. The carbonyl development test in which the extent of oxidation of the material to be stabilized is followed by taking infrared spectra of the sample at intervals during aging of polymer films. (See Bishop, Anal. Chem., 33, 456 (1961)).
2. The effect of heat and oxygen upon the Mooney viscosity of the polymer being stabilized.
3. The effect of the oxidative degradation of a polymer upon its tensile strength.

Examples of the use of these different test methods are selected here to demonstrate the antioxidant activity of my new polyphenol compositions in various elastomers. For convenience in identifying the compounds used in the various tests, the following list is provided, with identifying code designations:

| Code | Structure |
| --- | --- |
| E-1 | 4,4'-thiobis(beta-phenylethylene)diphenol |
| E-2 | 4,4'-thiobis(beta-phenylpropylene)diphenol |
| E-3 | 4,4'-thiobis(beta-phenylethylene)di-o-cresol |
| E-4 | 2,2'-thiobis(beta-phenylethylene)di-p-cresol |
| E-5 | 4,4'-thiobis(beta-phenylethylene)di2,6-xylenol |
| E-6 | mixed thiobis(beta-phenylethylene)dicresols" |
| E-7 | 2,2'-thiobis(beta-phenylethylene)bis(4-nonyl-phenol) |
| E-8 | 4,4'-thiobis(beta-phenylethylene)bis(2-t-butyl-phenol) |
| E-9 | 4,4'-thiobis(beta-tolylethylene)diphenols[b] |
| E-10 | 1,1'-thiobis(beta-phenylethylene)di-2-naphthol |
| E-11 | 2,2'-thiobis[beta-(4-t-butylphenyl)ethylene]di-p-cresol | a. An isomeric mixture derived from mixed m,p-cresols.
b. An isomeric mixture derived from vinyltoluene (a mixture of 3-methyl- and 4-methylstyrenes).

SOLUTION SBR

Rubber in the form of a benzene solution of commercial styrene-butadiene rubber (solution-polymerized SBR) containing 5 percent polymer was used in this test. Sufficient amounts of benzene solutions of the compounds to be tested as antioxidants were added to aliquots of the polymer solution so as to incorporate 1 part of the antioxidant per 100 parts of the polymer. By evaporation of the solvents, thin films of the polymer were prepared on sodium chloride discs (salt plates). These film samples were aged in air at 130° C. and removed from the oven at 1-hour intervals after the first one-half hour. Infrared spectra were run on these films and note made of the appearance of a carbonyl peak at 5.85 microns. The aging time required to cause the appearance of this peak, denoted the "break time," is used as a measure of effectiveness as an antioxidant of the compound incorporated into the polymer, by comparison with the break time of the unstabilized polymer.

| Added Stabilizer | Break Time (hrs.) |
| --- | --- |
| none | 0.5 |
| 2,6-Di-t-butyl-p-cresol | 1 |
| E-1 | 3 |
| E-7 | 3 |
| E-4 | 4 |
| E-6 | 5 |

These results correlate well with visual observation of the condition of samples of the solid polymer heat-aged under the same conditions. The results show that the compounds tested are effective stabilizers for solution SBR rubber, my polyphenols being much superior to the monophenol tested.

POLYISOPRENE

A 3 percent solution of commercial polyisoprene in benzene was used in this test. Amounts of benzene solutions of the compounds to be tested were added so as to furnish 1 part of stabilizer per 100 parts of polymer. Thin films of the polymer samples were prepared on salt plates and aged at 100° C. in an air oven. At 1-hour intervals the samples were examined by infrared spectroscopy to determine the appearance of carbonyl groups. The following data show the effectiveness of the compounds tested as stabilizers for polyisoprene:

| Added Stabilizer | Break Time (hrs.) |
| --- | --- |
| None | 2 |
| 2,6-Di-t-butyl-p-cresol | 3 |
| E-1 | 11 |
| E-4 | 25 |
| E-6 | 27 |
| E-7 | 27 |

When milled at 300° F., polyisoprene undergoes an oxidative degradation the extent of which can be measured by the change in Mooney viscosity. By the incorporation of stabilizers, the rate of decrease in Mooney viscosity can be reduced. The data below show the ability of several compounds of this invention to retard the degradation of commercial polyisoprene during milling at 300° F. The compounds tested were added at 1 part per 100 parts of polyisoprene.

| Added Stabilizer | ML-4 at 212°F. after milling at 300°F. for time $t$ | | |
| --- | --- | --- | --- |
| | $t = 0$ | $t = 15$ min. | $t = 30$ min. |
| none | 70 | liquid | liquid |
| E-1 | 66 | 45 | 32 |
| E-9 | 69 | 53 | 41 |
| E-8 | 68 | 60 | 45 |
| E-7 | **69 | 55 | 38 |
| E-3 | 67 | 42 | 34 |
| E-4 | 68 | 72 | 52 |
| E-5 | 65 | 61 | 41 |
| E-6 | 65 | 69 | 50 |

POLYBUTADIENE

A solution containing 8 percent by weight of commercial polybutadiene in toluene was used for evaluating the compounds as antioxidants. The test used involves following the development of a carbonyl group by infrared spectroscopy, as previously described. The compounds tested were used at the level of 1 part per 100 parts of polybutadiene.

| Added Stabilizer | Break Time (hrs.) |
| --- | --- |
| None | 0.5 |
| E-1 | 5 |
| E-7 | 9 |
| E-6 | 11 |
| E-11 | 10 |
| E-8 | 20 |
| E-10 | 26 |

These data show the ability of the compounds tested to stabilize polybutadiene against oxidation.

NATURAL RUBBER

The rubber stock in which the compounds were evaluated as antioxidants had the following composition:

| | |
| --- | --- |
| Pale crepe | 100.0 |
| Lithopone | 60.0 |
| Zinc oxide | 10.0 |
| Whiting | 60.0 |
| Zinc laurate | 0.5 |

| | | |
|---|---|---|
| Sulfur | | 3.0 |
| Tetramethyl thiuram sulfide | | 0.15 |

The polyphenolic compounds tested were added at the level of 1 part per 100 parts of pale crepe. Samples of the vulcanized stocks were aged in oxygen at 70° C. for 48 hours, after which the tensiles (T) and elongations (E) were compared with the values for the unaged stock, To and Eo. The percent retention of tensile (T/To × 100) and of elongation (E/Eo × 100) are measures of the effectiveness of the compounds added as antioxidants.

| Added Stabilizer | T/T. × 100 | E/E. × 100 |
|---|---|---|
| None | Too brittle to measure | |
| E-1 | 36 | 68 |
| E-9 | 52 | 76 |
| E-4 | 71 | 90 |
| E-2 | 63 | 89 |
| E-3 | 49 | 71 |
| E-7 | 44 | 80 |

EPDM RUBBER

The polymer used for this test is a commercial EPR rubber, a terpolymer of ethylene, propylene and dicyclopentadiene. To samples of a 4 percent hexane solution of this polymer were added sufficient amounts of a benzene solution of the stabilizer to incorporate 1 part of stabilizer per 100 parts of polymer. Thin films of the polymer samples were formed on salt plates by evaporation of the solvents. These samples were oven aged in air at 130° C., and the films were periodically examined by taking infrared spectra, until oxidation of the polymer became evident by the formation of carbonyl groups.

| Added Stabilizer | Break Time (hrs.) |
|---|---|
| None | 3 |
| E-7 | 9 |
| E-1 | 55 |

These data demonstrate the effectiveness of E-7 and E-1 in reducing the rate of oxidation of EPR rubber.

I claim:

1. A sulfur-containing polyphenolic product of the following formula:

$$(HO)_x Ar - \left[ \begin{array}{cccc} Ar' & R' & R' & Ar' \\ | & | & | & | \\ C & - C - S - C - C \\ | & | & | & | \\ R & H & H & R \end{array} - Ar_n(OH)_x \right]_n - H$$

wherein Ar is a carbocyclic aryl group selected from aryl, alkyl aryl, lower alkoxy aryl, benzyloxyaryl, lower alkylthio aryl, lower alkylidene bis aryl, oxy bis aryl, thio bis aryl, dithio bis aryl;

Arn is carbocyclic arylene resulting from the removal of a second hydrogen atom from the ring of Ar as defined above, and wherein, in the case of each of Ar and Arn, positions ortho to the phenolic hydroxyl group cannot contain more than one tertiary alkyl substituent;

Ar' is a carbocyclic aryl group selected from phenyl, lower mono and dialkyl phenyl, lower alkoxy phenol and mono and dihalo phenyl;

R is H or an alkyl group having one to four carbon atoms;

R' is H or methyl, or is —CH$_2$— or —CH$_2$CH$_2$— joined ortho to Ar';

$x$ is 1 or 2, and $n$ is a number from 1 to 5.

2. A polyphenolic product according to claim 1 wherein a plurality of phenolic rings are linked together by thiobis(beta-arylalkylene) radicals.

3. A polyphenolic product according to claim 1 wherein from two to five phenolic rings are linked together by thiobis(beta-arylethylene) radicals.

4. A polyphenolic product according to claim 1 wherein from two to five phenolic rings are linked together by thiobis(beta-phenylethylene) radicals.

5. A polyphenolic product according to claim 1 wherein two phenolic rings are linked together by a thiobis(beta-phenylethylene) radical.

6. 4,4'-Thiobis(beta-phenylethylene)diphenol.

7. 4,4'-Thiobis(beta-phenylethylene)di-o-cresol.

8. 2,2'-Thiobis(beta-phenylethylene)di-p-cresol.

9. 4,4'-Thiobis(beta-phenylethylene)bis(o-tert-butylphenol).

10. 4,4'-Thiobis(beta-phenylethylene)bis(o-sec-alkylphenol).

11. 4,4'-Thiobis(beta-phenylethylene)bis(isopropylphenol).

12. A method of making polyphenolic products of the kind defined in claim 1 which comprises reacting from 1 to 5 moles of a phenol with 1 mole of a thiodialkylene compound in which each of the carbon atoms beta to the sulfur atom is joined to a halogen atom selected from chlorine and bromine and to an aromatic structure lacking hydroxyl.

13. A method according to claim 12 which comprises reacting a phenol with a bis(beta-halogeno-beta-arylalkyl sulfide.

14. A method according to claim 12 which comprises reacting a phenol with a bis(beta-chloro-beta-arylalkyl) sulfide.

15. A method according to claim 12 wherein the reaction mixture is heated until evolution of hydrogen halide ceases.

16. A method according to claim 12 wherein a catalytic amount of a Lewis acid is included in the reaction mixture.

17. A method according to claim 12 wherein a catalytic amount of aluminum chloride is added to the reaction mixture.

* * * * *

PO-1050
(5/69)

UNITED STATES PATENT OFFICE
CERTIFICATE OF CORRECTION

Patent No. 3,668,258      Dated June 6, 1972

Inventor(s) Howard A. Hageman

It is certified that error appears in the above-identified patent and that said Letters Patent are hereby corrected as shown below:

In Claim 1, at column 13, line 51, that portion of the formula reading "$Ar_n$" should read --Arn--.

In Claim 1, at column 14, line 10, "lower alkoxy phenol" should read --lower alkoxy phenyl--.

Signed and sealed this 24th day of April 1973.

(SEAL)
Attest:

EDWARD M. FLETCHER, JR.      ROBERT GOTTSCHALK
Attesting Officer      Commissioner of Patents